United States Patent [19]
Pierce

[11] 3,790,236
[45] Feb. 5, 1974

[54] ALIGNMENT MEANS AND METHOD

[75] Inventor: Bernard N. Pierce, West Hartford, Conn.

[73] Assignee: The Merrow Machine Company, Hartford, Conn.

[22] Filed: Mar. 6, 1972

[21] Appl. No.: 231,806

[52] U.S. Cl. ............ 308/23, 29/149.5 R, 74/579 E
[51] Int. Cl. ............................................ F16c 43/00
[58] Field of Search... 29/149.5 R, 156.5 A; 308/15, 308/23, 54, 167, 179, 245; 123/195; 74/579 E

[56] References Cited
UNITED STATES PATENTS

| | | | |
|---|---|---|---|
| 2,560,413 | 7/1951 | Carlson | 29/149.5 R |
| 3,062,596 | 11/1962 | Duesenberg | 308/74 |
| 3,482,467 | 12/1969 | Volkel | 74/579 |
| 2,411,364 | 11/1946 | Butterfield | 74/579 |
| 2,553,935 | 5/1951 | Parks et al. | 308/23 |

Primary Examiner—Charles J. Myhre
Attorney, Agent, or Firm—Francis C. Browne et al.

[57] ABSTRACT

Two separable members are aligned by bringing them together while guiding one side of both members into alignment with respect to a linear axis, and guiding the other side of the members into an aligned position in an arcuate path centered about the aforesaid linear axis without interfering with movement in a direction normal to the linear axis. Guidance with respect to the linear axis is performed by an axial alignment pin frictionally retained in one of the bearing segments and having a projecting conical surface for engaging within an aperture in the other member. Guidance in the arcuate path is performed by a tapered lateral positioning pin frictionally retained in one of the members and engaging an aperture in the other member only at spaced apart portions so as not to interfere with the guiding function performed by the first pin. On the first occasion when the members are assembled, the untapered end of the pins are forced into their supporting member to locate accurately the projecting tapered portion.

16 Claims, 8 Drawing Figures

PATENTED FEB 5 1974 3,790,236
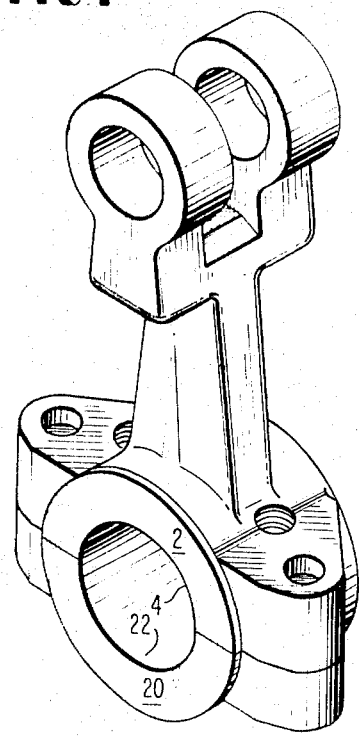
FIG.1
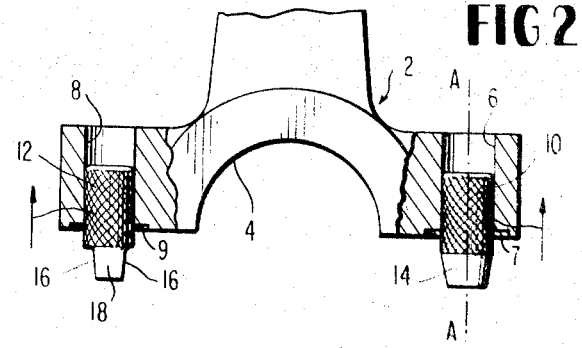
FIG.2
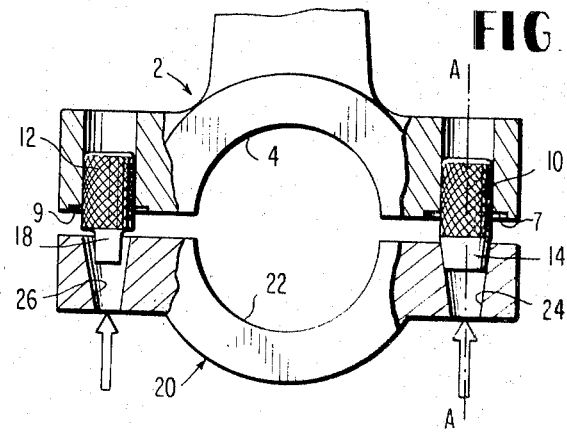
FIG.3
FIG.6
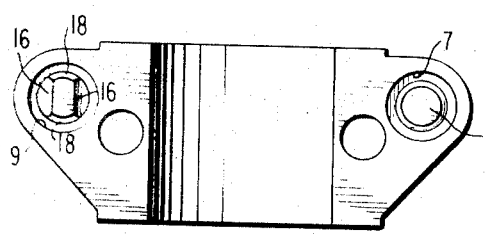
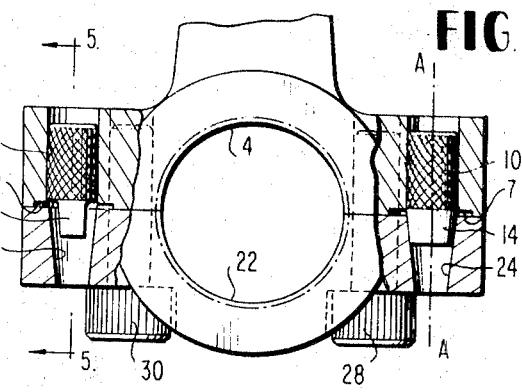
FIG.4
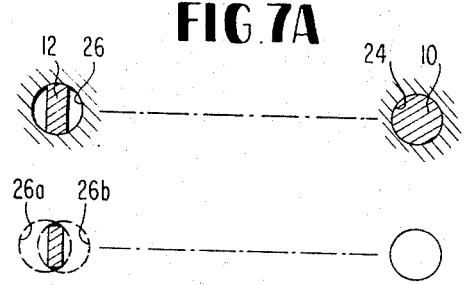
FIG.7A
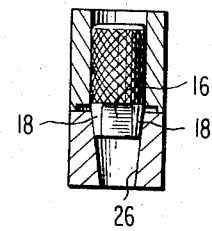
FIG.5
FIG.7B

ALIGNMENT MEANS AND METHOD

This invention is related to a means and a method for providing precise alignment between two separable members which for illustrative purposes are described as the halves of a split ring bearing assembly. Due to the repeatable accuracy of alignment which is achieved, the invention is well suited to the alignment of such bearing segments before the journal surface is machined therein, and to the subsequent alignment of bearing segments which have already been so machined.

Prior to this invention, a great number of approaches have been used for aligning separable members. Alignment pins are frequently used and can produce commercially acceptable results, however, there are some instances where conventional tapered alignment pins have been found unsatisfactory, particularly when there are slight deviations between the pin-to-pin distance on one member segment and the aperture-toaperture distance on the other member, causing the pins to oppose each other when guiding the members into alignment.

It has also been known to use one cylindrical pin and one pin of diamond-shaped cross-section, both of which are untapered and are inserted into circular holes. Such an arrangement requires extremely close manufacturing tolerances and cannot provide accurate and repeatable alignment when the sizes of the pins are slightly smaller than the sizes of the apertures they engage as is necessary for convenient assembly and disassembly.

According to the present invention, one pin is used to establish a linear line of reference which lies parallel to the direction in which the members are moved together. Another pin located on the other side of the members is configured so as not to oppose any guiding movement performed by the first pin, not to produce movement in any direction normal to the linear axis established by the first pin, but only to guide the members together in an arcuate path which is centered about the linear axis established by the first alignment pin. Accordingly, a basic aspect of the invention is the concept of bringing the members together in a given direction while guiding one side of the members with a tapered pin into alignment with a linear axis which lies parallel to the given direction, and guiding the other side of the members in an arcuate path centered about the linear axis without interfering with the movement of the other side of the members in a direction normal to the linear axis.

An important and preferred use of the invention is to align the halves of split ring bearings.

A complete understanding of the principles of the invention in such an environment may be had by referring to the following description and the accompanying drawings.

FIG. 1 is a perspective view of a connecting rod constructed for use in a sewing machine and provided at one end with a split ring bearing assembly which embodies the principles of the invention.

FIG. 2 is a partial sectional view of the upper bearing segment provided with aligning pins contemplated for use in connection with the present invention.

FIG. 3 shows the upper bearing segment of FIG. 2 engaged by alignment pins with the lower bearing segment prior to the forcible drawing of the bearing segments together.

FIG. 4 shows the bearing segments and alignment pins in their final positions, with bearing surfaces having been machined in the assembled aligned bearing segments.

FIG. 5 is a sectional view taken along the line 5—5 in FIG. 4, illustrating the relieved faces of one of the alignment pins.

FIG. 6 is a view of the bearing segment as seen by looking upwardly at the assembly shown in FIG. 2.

FIG. 7A and 7B are diagramatic illustrations of the principles of the invention, particularly with respect to the ability of the second alignment pin not to interfere with the relative positioning established by the first alignment pin.

The drawings depict a connecting rod with a split ring bearing assembly; however, the invention is equally applicable to other types of separate members. The upper bearing segment 2 has an arcuate surface which provides the bearing surface or is capable of providing such a surface upon subsequent machining. The oppositely extending flanges of the upper bearing assembly are provided with apertures 6 and 8 which frictionally retain the alignment pins 10 and 12. Shallow counterbores 7 and 9 surround the apertures 6 and 8. The alignment pins 10 and 12 are press fit into the apertures 6 and 8 but are axially movable therewithin when subjected to the forces used to draw bearing segments together. Preferably, their cylindrical exterior surface is provided with a plurality of small radiating projections to allow a wider manufacturing tolerance. Such projections are typically produced by a knurling operation.

The axial alignment pin 10 has a projecting, outwardly converging tapered portion 14 which is adapted to engage the wall of an aperture in the lower bearing segment and provide accurate alignment between the respective bearing segments along the axis A—A. The lateral positioning pin 12 on the left side of the upper bearing segment has generally planar relieved surfaces 16 and converging tapered surfaces 18, the taper of which may be seen in FIG. 5. The taper angle of both pins should be more than a few degress and less than that which would force the pins 10 and 12 into the apertures 6 and 8 when opposing forces are applied to bearing segments 2 and 20 at right angles to the axis A—A.

As shown in FIGS. 3 and 4, the lower bearing segment 20 has an arcuate surface 22 corresponding to the surface 4 in the upper bearing segment, and complementing it so as to form the circular cross section upon assembly of the bearing segments. The right side of the lower bearing segment 20 has an aperture 24 of circular cross section for receiving the alignment pin 10. The left side of the lower bearing segment has an identical aperture 26 for receiving the alignment pin 12. Preferably, the apertures 24 and 26 are tapered and possess a taper angle equal to that of the converging portions 14 and 18 of the respective alignment pins.

Initial assembly of the two bearing segments involves two stages, with the first stage occurring by bringing the alignment pins 10 and 12 into contact with the walls of the apertures 24 and 26 in the lower bearing segment. This engagement occurs before contact between the bodies of the bearing segments 2 and 20 due to the extent of projection of the alignment pins 10 and 12. At the stage illustrated in FIG. 3, the relative positioning of the bearing segments is established in part by the pin 10 which engages the aperture wall 24. This creates accurate positioning along the axis A—A through the axis of the pin. The axis having been established, the function of the pin 12 is to rotatively align the bearing segments about the axis A—A. This rotative alignment is produced by the converging surfaces 18 of the pin 12, which act upon spaced apart portions of the aperture wall 26 as seen in FIGS. 6, 7A and 7B. Another way of expressing the alignment principle is that pin 10 establishes alignment with respect to a linear axis through the mating parts, and pin 12 establishes alignment of a plane defined by the longitudinal centerlines of pins 10 and 12 with a plane defined by the longitudinal centerlines of apertures 24 and 26.

The second stage of the alignment operation involves the forcing of the two bearing segments together, usually under the influence of threaded fasteners such as the bolts 28 and 30 shown in FIG. 4. This force drives the pins 10 and 12 further into their apertures 6 and 8 to a final position where the bearing segments 2 and 20 are properly aligned, the converging surfaces of the pins 10 and 12 are engaged against the walls of the apertures 24 and 26, and the flanges of the respective bearing segments are in abutment with each other. Any particles shaved from the pins 10 and 12 are received in the counterbores 7 and 9 so as not to interfere with the mating of the planar faces of the bearing segments 2 and 20.

The construction of the bearing segments and the location of the bolts 28, 30 and/or alignment pins 10, 12 should be designed to preclude the inadvertent reversal during reassembly of the bearing segment 20 with respect to the bearing segment 2.

After the bearing segments are drawn together, the bearing assembly may be machined to the dimensions desired for the appropriate journal. An oil groove may be placed therewithin as shown in broken lines in FIG. 4. Then, the bearing segments may be disassembled and reassembled repeatedly according to the invention with the assurance that they will be accurately aligned.

The alignment principle of this invention is illustrated diagramatically in FIGS. 7A and 7B. In FIG. 7A, the center-to-center spacing between the alignment pins 10 and 12 is precisely equal to the distance between the alignment openings 24 and 26 in the lower bearing segment. Since the tapered section of the pin 10 completely fills the alignment aperture 24, it will produce the accurate alignment with respect to axis A—A. The pin 12, however, has the relieved surfaces so that it contacts the wall of the alignment aperture 26 only at spaced apart portions, thereby providing only guiding forces which lie in an arcuate path centered about the axis A—A which coincides with the center of the pin 10.

When the center-to-center distances of the respective elements are equal as shown in FIG. 7A, proper alignment would be attainable if the pin 12 were replaced with a conventional alignment pin such as pin 10. The significance of this invention comes into play when there are unequal center-to-center distances as shown in FIG. 7B where the broken lines 26a and 26b represent two possible locations of the alignment apertures 26 in the left side of the lower bearing segment. If the apertures were at the location shown at 26a, the pin 12 would lie to the right of the center of the aperture 26a, but its surfaces 18 would still provide the arcuate guiding movement by contacting the wall of aperture 26a at spaced apart points. Similarly, the location of the aperture at 26b would provide spaced apart contact, arcuate guiding movement and proper alignment between the respective elements. For purposes of illustration, the distance deviations shown in FIG. 7B have been greatly exaggerated, but it will be understood that the principles are apt even when the opening 26 is only slightly offset from the ideal position shown in FIG. 7A.

FIG. 7B also offers a comparison between this invention and the prior art which utilizes alignment pins identical to pin 10 on both sides of the bearing segments. If a conventional taper pin 10 engaged either of the offset alignment apertures 26a or 26b, the efforts of the two alignment pins would oppose each other and would result in tangential contact between the tapered alignment surfaces and their associated apertures. This arrangement would not provide accurate alignment of either of the pins along an axis such as that designated A—A in this specification, nor would it ensure proper relative arcuate positioning between the two bearing segments.

Of course, the invention may assume many forms other than the specific one disclosed herinabove. It is preferable but not essential that the alignment apertures 24 and 26 be tapered. The alignment pins 10 and 12 may initially be placed in different bearing segments or both may be placed in the lower bearing segment. Preferably, the included angle of the apertures 24 and 26 should be slightly less than the included angle of tapers 14 and 18 on pins 10 and 12 so that the actual points of contact between the apertures and tapers are at or near the plane of the flanges. Other modifications and variations will occur to those skilled in the art and are encompassed by the language and spirit of the claims which follow.

I claim:

1. A method of aligning a pair of separable members comprising the steps of bringing the members together in a given direction while:
   a. guiding one side of the members into alignment with a linear axis which lies parallel to the given direction, and said guiding step (a) being performed by engaging a tapered portion of an axial alignment pin on one member with the wall of an aperture in the other member while
   b. guiding the other side of the members in an arcuate path centered about the said linear axis without interfering with its movement in a direction normal to said linear axis.

2. The method of claim 1 wherein the members are the segments of a split ring bearing assembly, said method including the further step of machining a bearing surface in the aligned bearing segments.

3. The method of claim 1 wherein the axial alignment pin is frictionally retained in an aperture in one member and projects a distance such that the tapered portion contacts the wall of an aperture in the other member prior to contact between the members, and moving the axial alignment pin axially in the aperture in the one said member after engaging the tapered portion of the axial alignment pin with the wall of the aperture in the other member.

4. The method of claim 1 wherein step (b) is performed by means of a lateral positioning pin previously attached to one said member and having projecting, outwardly converging tapered portions, said other member having an aperture for receiving the lateral positioning pin, said guiding step (b) being performed by engaging the wall of the aperture with only spaced apart said tapered portions to position the other side of the other member rotatively with respect to the linear axis without interfering with its movement in a direction normal to said linear axis.

5. The method of claim 4 wherein the members are the segments of a split ring bearing assembly, said method including the further step of machining a bearing surface in the aligned bearing segments.

6. The method of claim 4 wherein the lateral positioning pin is frictionally retained in an aperture in the one member and projects a distance such that the tapered portion contacts the wall of the aperture in the other member prior to contact between the members, and moving the lateral positioning pin axially in the aperture in the one said member after engaging the wall of the aperture with only spaced apart said tapered portions.

7. The method of claim 6 wherein the axial alignment pin is frictionally retained in an aperture in one member and projects a distance such that the tapered portion contacts the wall of an aperture in the other member prior to contact between the members, and moving the axial alignment pin axially in the aperture in the one said member after engaging the tapered portion of the axial alignment pin with the wall of the aperture in the other member.

8. A method of providing for repeatable alignment between a pair of separable members each having a pair of parallel apertures spaced apart a given distance comprising the steps of placing an axial alignment pin in a first said aperture, said axial alignment pin having a tapered projecting portion which is engageable in a second said aperture in the second said member to produce alignment between the first aperture and the second aperture along a given axis; placing a lateral positioning pin in a third said aperture which is in one of the members, said lateral positioning pin having spaced apart tapered portions which are engageable with only portions of the wall of a fourth said aperture in the other said member to provide angular orientation of the members with respect to the given axis;

moving the members toward each other until each pin engages its respective aperture in the other member, and then forcing the members together to displace the axial alignment pin axially into the first aperture and to displace the lateral positioning pin axially into the third aperture.

9. An assembly comprising a pair of separable members which are assembled and disassembled by relative movement along a given axis, first alignment means operable between confronting first sides of the respective separable members for guiding the first sides of the separable members together into alignment with a linear axis which lies parallel to the given axis, said first alignment means comprising an axial alignment pin attached to one member and having a projecting tapered portion engageable within an aperture in the other member, second alignment means operable between confronting second sides of the respective separable members for guiding the second sides of the separable members in an arcuate path centered about said given axis without interfering with their relative movement in a direction normal to said given axis.

10. The assembly of claim 9 wherein the second alignment means is a lateral positioning pin attached to one said member and having a projecting tapered portion for engaging only spaced apart portions of an aperture in the other member so as not to interfere with relative movement of the bodies in directions normal to the given axis established by the axial alignment pin.

11. The assembly of claim 10 wherein both of said pins are axially displaceable in the member or members to which they are attached, and including means for retaining the pins in the positions to which they are displaced during the initial alignment of the members, whereby the pins will project the precise distance needed for alignment after separation of the members.

12. The assembly of claim 10 wherein the separable members are halves of a split ring bearing assembly, said members having mutually confronting recesses of semicircular cross-sections located between said pins.

13. The assembly of claim 9 wherein said pins are axially displaceable in the member or members to which they are attached, and counterbore means around the pin in one of the members to receive any particles shaved from the pins as they are axially displaced.

14. The assembly of claim 9 wherein the projecting tapered portion of the axial alignment pin has a taper angle which is more than a few degrees and less than that which would produce axial dislacement of the axial alignment pin in response to forces disposed at right angles thereto.

15. The assembly of claim 10 having threaded fasteners for holding the separable members together, said threaded fasteners and said alignment pins being located to prevent inadvertent reversal of the separable members during reassembly.

16. The assembly of claim 10 wherein the tapered projecting portions of both said pins have a taper angle which is more than a few degrees and less than that which would produce axial displacement of the axial alignment pin in response to forces disposed at right angles thereto.

* * * * *